United States Patent [19]

Hammond

[11] Patent Number: 4,759,676
[45] Date of Patent: Jul. 26, 1988

[54] WHEELED VEHICLE CONVEYING SYSTEM

[76] Inventor: Theodore A. Hammond, 9700 Ravine Ridge, Caledonia, Mich. 49316

[21] Appl. No.: 894,448

[22] Filed: Aug. 1, 1986

Related U.S. Application Data

[63] Continuation of Ser. No. 646,667, Aug. 31, 1984, abandoned.

[51] Int. Cl.⁴ .............................................. B65G 1/06
[52] U.S. Cl. ................................... 414/276; 108/51.1; 193/35 A; 414/286
[58] Field of Search ............ 414/276, 286; 193/35 A, 193/40; 188/38, 41, 44; 104/164, 249, 250; 105/238 R, 238.1; 108/51.1

[56] References Cited

U.S. PATENT DOCUMENTS

| | | | |
|---|---|---|---|
| 2,521,660 | 9/1950 | Westover | 108/51.1 X |
| 2,979,177 | 4/1961 | Sullivan | 193/35 A |
| 3,108,671 | 10/1963 | Fuka et al. | 193/35 A |
| 3,760,741 | 9/1973 | Belcher | 108/51.1 X |
| 3,837,511 | 9/1974 | Howlett | 414/286 X |
| 3,942,814 | 3/1976 | Buhler | 414/286 X |
| 3,982,639 | 9/1976 | Haldimann et al. | 414/276 |
| 4,253,558 | 3/1981 | Roeing et al. | 193/35 A |
| 4,424,752 | 1/1984 | Aberg | 108/51.1 |

FOREIGN PATENT DOCUMENTS

| | | |
|---|---|---|
| 341428 | 2/1978 | Austria . |
| 579616 | 11/1931 | Fed. Rep. of Germany ........ 188/38 |
| 2033223 | 3/1971 | Fed. Rep. of Germany . |

Primary Examiner—Frank E. Werner
Assistant Examiner—David A. Bucci
Attorney, Agent, or Firm—Flynn, Thiel, Boutell & Tanis

[57] ABSTRACT

A transporting arrangement, specifically suited for use in a storage rack, employing gravity-urged wheel-supported buggies for storing and transporting goods. The buggies are rollingly supported on elongated rails having flat support surfaces for engagement with the buggy wheels, and a pulsating activating device coacts with and extends longitudinally along the apparatus for causing the buggy to be cyclically relatively moved into and out of engagement with a longitudinally elongated brake in a repetitive manner to permit the buggy to move by gravity in a controlled steplike manner downwardly along the inclined support rails.

6 Claims, 3 Drawing Sheets

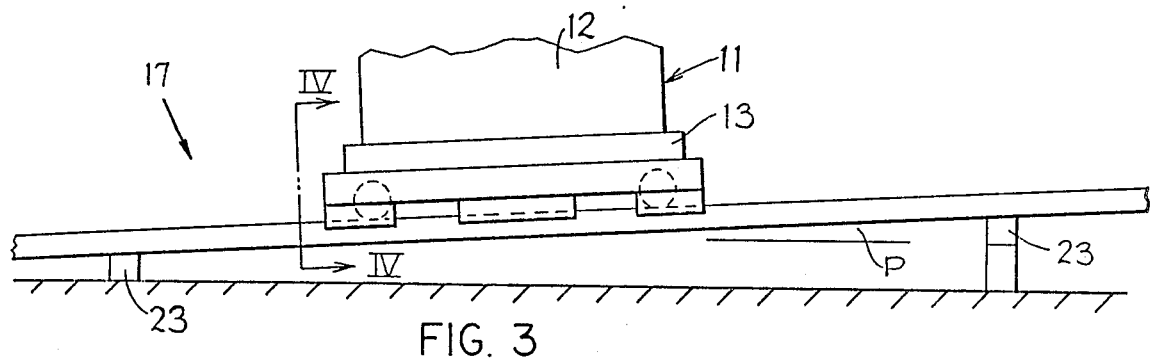
FIG. 3
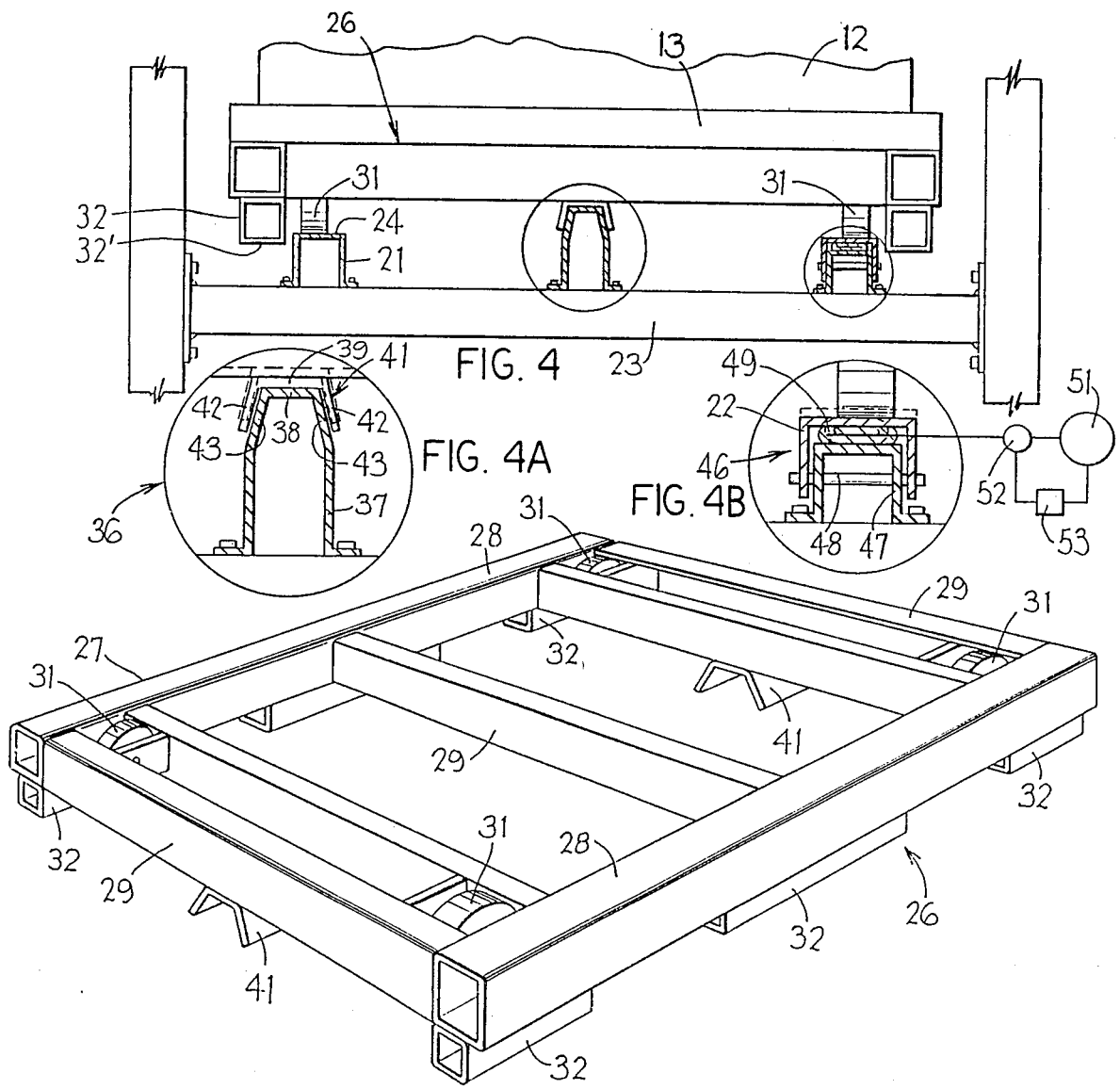
FIG. 4
FIG. 4A
FIG. 4B
FIG. 5

WHEELED VEHICLE CONVEYING SYSTEM

This application is a continuation of U.S. Ser. No. 646,667, filed Aug. 31, 1984 now abandoned.

FIELD OF THE INVENTION

This invention relates to an improved gravity-type transporting or conveying system for loads, specifically loads supported on wheeled slave pallets, and particularly to a system which is highly desirable for use as part of a first in-first out storage rack system.

BACKGROUND OF THE INVENTION

My earlier U.S. Pat. Nos. 4,205,740, 4,040,876 and 4,304,521 disclose pulsating gravity-type conveyors which are particularly desirable for conveying palletized loads, specifically articles supported on conventional wooden pallets, and which are also highly desirable for use in storage-rack systems for permitting "first in-first out" storage of palletized loads. In this known conveyor or storage rack system, the loaded pallets are supported directly on the conveyor rollers, and the conveyor itself involves a large number of rollers which are disposed in longitudinally adjacent relationship and are supported by a carriage or rail structure which enables the rollers to vertically reciprocate in a cyclic or repetitive manner. This arrangement physically causes the palletized loads to be intermittently lifted and lowered relative to a longitudinally extending stationary brake, the pallets hence being stopped by the brake when the pallets and rollers are in their lowered positions. While this known arrangement has proven highly successful and desirable for transporting and storing palletized loads, particularly in storage racks, nevertheless this system has been recognized to possess features which are, in some instances, considered less than optimum. For example, this arrangement requires a large number of rollers disposed longitudinally in series and extending along the length of the conveyor, with the rollers themselves being mounted on carriages or rails which can be vertically reciprocated. This hence increases the expense and complexity of the overall system. In addition, this known arrangement normally requires that the conveyor be provided with a substantial pitch, such as six inches of pitch or vertical drop for each ten feet of length in order to ensure that the palletized loads will freely move by gravity downwardly along the irregular support surface defined by the pulsating rollers. The magnitude of pitch becomes significant when the conveyor or storage rack is of substantial length, and hence can restrict the number of conveyors which can be vertically stacked directly above one another within the rack.

In recent years, it has been proposed to utilize wheeled pallets or buggies for supporting, storing and transporting goods or articles, and some of the known systems have relied upon a gravity-type conveying arrangement for controlling these wheeled buggies. These known arrangements, while they are desirable in that they require wheels only on the pallets and hence permit the pallets to be rollingly supported on flat support surfaces, have nevertheless met with only limited commercial success in view of the great difficulty experienced in controlling the gravity-urged movement of the buggies downwardly along an incline. For this reason, gravity-type buggy conveying arrangements have not met with wide commercial success and, in fact, have had only minimal commercial utilization.

Hence, it is an object of this invention to provide a transporting or conveying arrangement, specifically suited for use in a storage rack, which arrangement employs gravity-urged wheel-supported buggies or pallets for storing and transporting goods thereon. In the arrangement of this invention, the pallets or buggies can be rollingly supported on elongated rails having flat support surfaces for engagement with the buggy wheels, and a pulsating or cyclic activating means coacts with and extends longitudinally along the apparatus for causing the buggy to be cyclically relatively moved into and out of engagement with a longitudinally elongated brake in a repetitive manner to permit the buggy to move by gravity in a controlled steplike manner downwardly along the inclined support rails. In this manner, a controlled and failsafe operation is achieved so as to regulate the gravity-urged movement of the buggies and of the loads thereon, and at the same time the control can be readily achieved by a pulsating activating means which extends longitudinally along the apparatus to provide the desired intermittent frictional engagement between the pallet and the brake.

In a preferred embodiment of the invention, the brake is mounted on and extends longitudinally of the framework and cooperates with brake pads secured to the underside of the buggy. A separate pulsating or cyclic activating device coacts with one of the support rails to periodically and cyclically lift and lower the one support rail a small extent so that the buggy hence intermittently disengages and then engages, in a repetitive fashion, the brake pad to cause a steplike gravity-urged movement of the buggy downwardly along the support rails.

In the preferred embodiment, the brake pad on the buggy and the brake member on the frame are preferably provided as opposed channellike elements which nest one within the other, these elements having diverging sidewalls which function as guides to facilitate automatic realigning or recentering of the buggy when the latter is lowered into engagement with the brake member.

With the improved arrangement of this invention, the buggies can be successfully gravity-urged downwardly along the rails while providing the rails with only minimum pitch, such as a pitch in the order of two to four inches per each ten feet of horizontal length. This minimizes the overall vertical drop as the arrangement extends over a substantial horizontal length, and hence permits a storage rack in some instances to accommodate a greater number of vertically stacked bays within the same maximum rack height.

With the improved arrangement, there is provided a plurality of buggies which in effect comprise slave pallets, which slave pallets comprise an integral part of the system and mount the rollers thereon. These slave pallets themselves define an upper support surface which permits loads to be positioned thereon, which loads normally comprise wooden pallets having goods or articles thereon. The use of these slave pallets as buggies hence provides the system with a high degree of reliability and dimensional stability so as to provide precise control over the gravity-urged movement.

Other objects and purposes of the invention will be apparent to persons familiar with systems of this general type upon reading the following specification and inspecting the accompanying drawings.

BRIEF DESCRIPTION OF THE DRAWINGS

FIG. 3 is a side diagrammatic elevational view illustrating the conveying or transporting arrangement of this invention, one of which arrangements would be associated with each of the bays formed by the storage rack of FIGS. 1 and 2.

FIG. 4 is an enlarged fragmentary view, partially in cross section, as taken substantially along line IV—IV in FIG. 3.

FIGS. 4A and 4B are enlarged views which illustrate the circled areas of FIG. 4.

FIG. 5 is a perspective view of the wheeled buggy or pallet.

Figure 1:
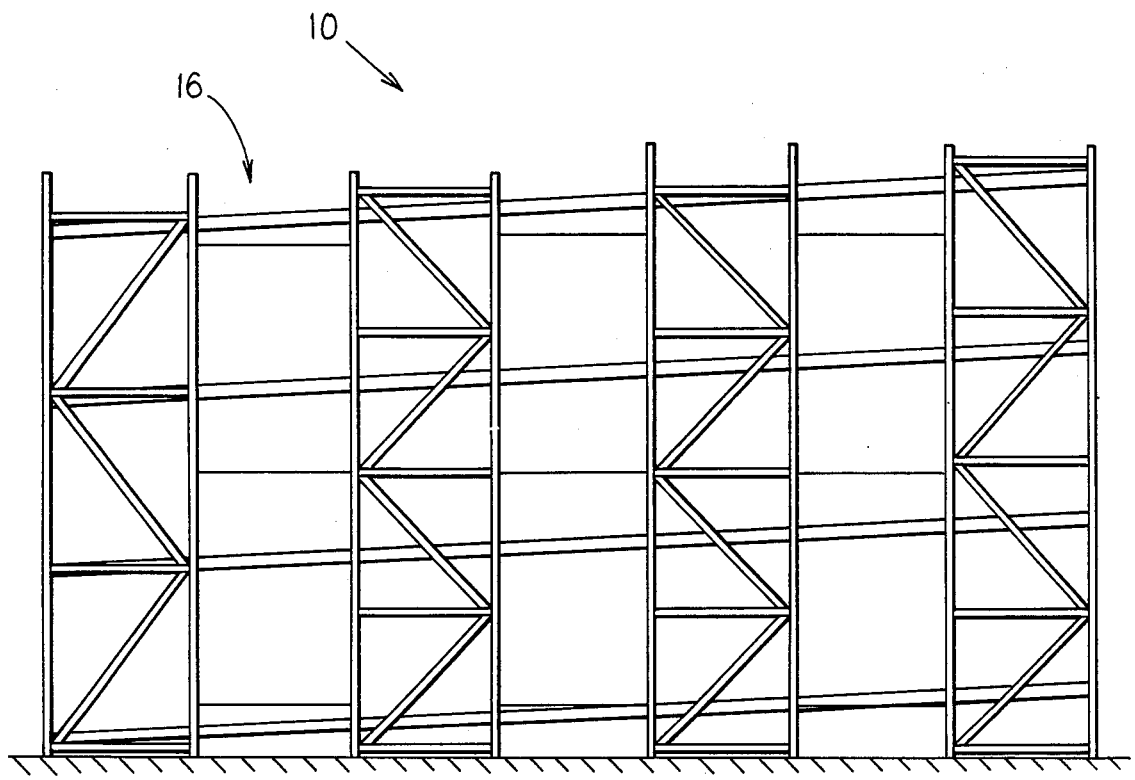
FIG. 1 diagrammatically illustrates a side elevational view of a transporting or conveying-type storage rack system for loads, specifically palletized loads.

Certain terminology will be used in the following description for convenience in reference only and will not be limiting. For example, the words "upwardly", "downwardly", "rightwardly" and "leftwardly" will refer to directions in the drawings to which reference is made. The words "downwardly" and "forwardly" will also refer to the normal direction of movement of the palletized loads, which movement is from right to left in FIGS. 1 and 3. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 2:
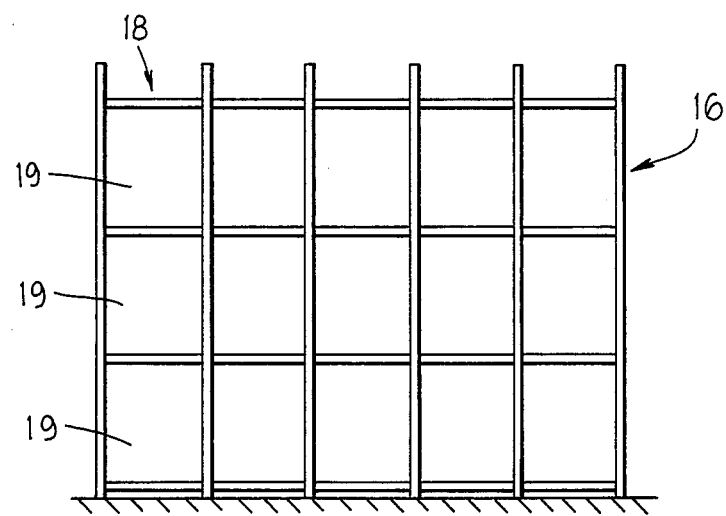
FIG. 2 illustrates the output end of the storage rack, namely the rightward end of FIG. 1.

FIGS. 1-3 illustrate a conveying or transporting system 10 designed specifically for handling and storing palletized loads 11, which loads in the illustrated embodiment comprise suitable articles or goods 12 stacked on a conventional wood pallet 13. The transporting system 10, in a preferred embodiment, incorporates a rack-type framework 16 so as to support thereon a plurality of gravity-type transporters or conveyors 17 which are of the "first in-first out" type. In the illustrated embodiment, the framework 16 is illustrated as having five adjacent columns or bays 18 each including three tiers 19 disposed vertically one above the other, which tiers 19 each have one of the gravity-type conveyors or transporters 17 associated therewith and extending longitudinally therealong between the input and output ends of the system.

The gravity-type transporter 17 extends longitudinally of the system 10 and is inclined downwardly at a small angle as it extends from the inlet end (rightward end in FIG. 1) to the outlet or discharge end (leftward end in FIG. 1). The transporter 17, as illustrated by FIGS. 3 and 4, includes a pair of parallel and sidwardly spaced support rails 21 and 22 which extend longitudinally of the system at a slight downward incline. In the illustrated embodiment, the rail 21 is directly fixedly supported on transverse frame members 23, and the other support rail 22 is indirectly and movably supported on these transverse frame members 23 as described hereinafter. The support rails 21 and 22 define thereon substantially planar upper roller-engaging surfaces 24.

To transport the loads 11 along the system, the transporter 17 also includes a plurality of wheeled slave pallets 26, hereinafter referred to as buggies. Each of these buggies is formed by a substantially rectangular support platform 27 defined by parallel and longitudinally extending side supports 28 rigidly joined together by a plurality of transverse supports 29. The support platform 27 is provided with conventional rollers or wheels 31 rotatably supported thereon adjacent each corner of the platform, whereby the platform is hence normally provided with four rollers which project downwardly below the lower surface of the platform for rolling engagement with the surfaces 24 of the support rails 21 and 22. The buggy 26 is also provided with fixed support legs 32 which are disposed in the vicinity of the corners of the platform and project downwardly to enable the platform to be supported on a support surface, such as a floor. For this purpose, the legs 32 project downwardly so that the lower ends (i.e., the bottom surface 32') thereof are disposed at an elevation slightly below the lowermost elevation of the rollers 31 so that, when supported on a floor by the legs, the rollers will be spaced upwardly out of engagement with the floor. These legs 32 in the illustrated embodiment comprise horizontally oriented tubular channels which are fixedly secured to the underside of the platform side supports 28 and are elongated generally parallel to the side supports. These legs are preferably disposed outwardly from the wheels so that they extend slightly downwardly along opposite outer sides of the support rails 21 and 22, as illustrated by FIG. 3.

The transporter 17 also includes a brake means 36 which coacts between the frame and the buggy. This brake means includes a brake member 37 which is fixedly secured to and extends longitudinally along the frame, this brake member 37 in the illustrated embodiment being disposed substantially midway between the support rails 22-22 and disposed below the buggies. This brake member 37 has a top wall 38 which functions as the braking pad and is adapted for slidable frictional braking engagement with an elongated brake pad 39 as fixedly secured to the underside of the buggy. The brake member 37 is, in the illustrated embodiment, preferably formed as an inverted channel member which is secured to and projects upwardly from the transverse frame members 23. The top wall 38 defines a substantially continuous brake surface which extends longitudinally of the bay in parallel relationship to the surfaces 24.

The brake pad 39 is formed by a downwardly opening channel member 41 which is secured to and opens downwardly from the underside of the buggy 26. The buggy has a pair of these channel members 41 mounted thereon in aligned relationship adjacent the front and trailing ends thereof, the channel members 41 being disposed substantially along the central vertical plane of the buggy. Each channel member 41 has a pair of downwardly projecting side legs of flanges 42 which diverge outwardly at a small angle, and similar diverging sidewalls 43 are formed on the brake member 37 and project downwardly from the top wall 38 thereof. The channel member 41 is adapted to telescope downwardly and nest around the brake member so that the side legs 42 hence are positioned adjacent the other surfaces of the sidewalls 43. The spacing between the side legs 42 normally slightly exceeds the spacing between the sidewalls 43 so that a slight clearance exists therebetween when the brake pad 39 is engaged with the top wall 38, whereby primary friction braking hence occurs solely between these two latter surfaces. However, if the buggy tends to sidewardly misalign, then one of the side legs 42 will contact the adjacent sidewall 43 to effect automatic recentering of the buggy as explained hereinafter. The nesting of the sidewalls 43 within the channel member 41 also prevents the buggy from moving out of engagement with the support rails 21–22.

To provide for controlled gravity-urged movement of the buggy 26 downwardly along the inclined support rails 21–22, there is provided a cyclic activating means 46 for effecting cyclic engagement and disengagement between the brake elements 38 and 39 according to a predetermined pattern or frequency. This cyclic activating means includes a mounting rail or channel 47 which is fixedly secured to the transverse frame members 23 and extends longitudinally along the respective bay. This mounting channel has the support rail 22 disposed in nesting or telescopic relationship therearound, with the support rail 22 and mounting rail 47 being joined together by a plurality of transversely extending pins 48 disposed at longitudinally spaced intervals. These pins 48 extend through vertically elongated slots (not shown) formed in the side legs of one of the rails to permit the support rail 22 to vertically reciprocate upwardly and downwardly relative to the mounting rail 47. A suitable cyclic drive member 49, such as an elongated pneumatically inflatable hose, is positioned between the rails 22 and 47. This hose 49 is supplied with pressurized air from the conventional motor-compressor unit 51 through standard valving 52, and an appropriate control unit 53 is provided so as to cyclically inflate and deflate the hose 49 in a cyclic and intermittent manner, such as at the rate of several cycles per minute, to effect cyclic raising and lowering of the support rail 22.

During operation of the transporter 17, the hose 49 is inflated which causes the support rail 22 to be lifted upwardly a small extent, such as approximately ¼ to ⅜ths inch. This hence effects a slight lifting of one side of the buggy 26, thereby causing the brake element 39 to be lifted upwardly out of frictional engagement with the stationary brake pad 38. Due to the incline of the support rails, the buggy 26 will then move forwardly (i.e., downwardly) along the support rails due to the urging of gravity. However, shortly after inflation, the control unit 53 will cause at least partial deflation of the hose 49 so that the support rail 22 is lowered downwardly and causes the brake element 39 to engage the stationary brake element 38, thereby frictionally stopping the buggy. This inflation and deflation of the hose occurs in a cyclic and repetitive manner, and in a regular pulsating pattern, so that the buggy 26 can hence be gravity-urged downwardly along the support rails in a steplike manner. The system, however, is failsafe since any failure will result in deflation of the hose, and hence automatic engagement of the brake so as to stop the buggy.

During inflation, the slight upward lifting of the buggy causes the channel members 42 to be slightly lifted upwardly, thereby increasing the clearance between the channel member 41 and the brake member 37. However, the upward lifting of the buggy is less than the vertical overlap between the side legs 42 and side walls 43, so that the latter will still effectively sidewardly guide and confine the buggy and prevent it from falling sidewardly off of the support rails. The platform legs 32 also assist in preventing the buggy from falling sidewardly off of the support rails. In addition, when the hose is deflated so as to lower the buggy, if the buggy has moved slightly sidewardly to an off-center position, then one of the side legs 42 will engage the respective sidewall 43 during lowering, and hence effect an automatic sideward shifting of the buggy to assist in recentering thereof.

The system and controls for cyclically inflating and deflating the hose 49 are well known, having already been utilized in the system of Applicant's earlier U.S. Pat. No. 4,205,740, so that further description thereof is believed unnecessary. In addition, rather than utilizing an inflatable hose for effecting cyclic raising and lowering of the support rail 22, other mechanical means such as reciprocating ramps or rotatable eccentrics could also be utilized.

When utilized in a storage rack arrangement as illustrated by FIGS. 1 and 2, the buggies are loaded into the individual tiers of each bay at the inlet end thereof as appearing on the right side of FIG. 1. The individual loads are then gravity-urged in a steplike manner downwardly through the tier toward the lower outlet end due to the reciprocating movement of the support rail 22. The buggy which is disposed at the outlet end is appropriately held by means of a stop (not shown), whereby removal of this buggy at the outlet end by means of a forklift or other suitable removal crane hence enables the remaining loads or buggies to be gravity-urged downwardly in a steplike manner until the next frontmost buggy contacts the stop.

Figure 6:
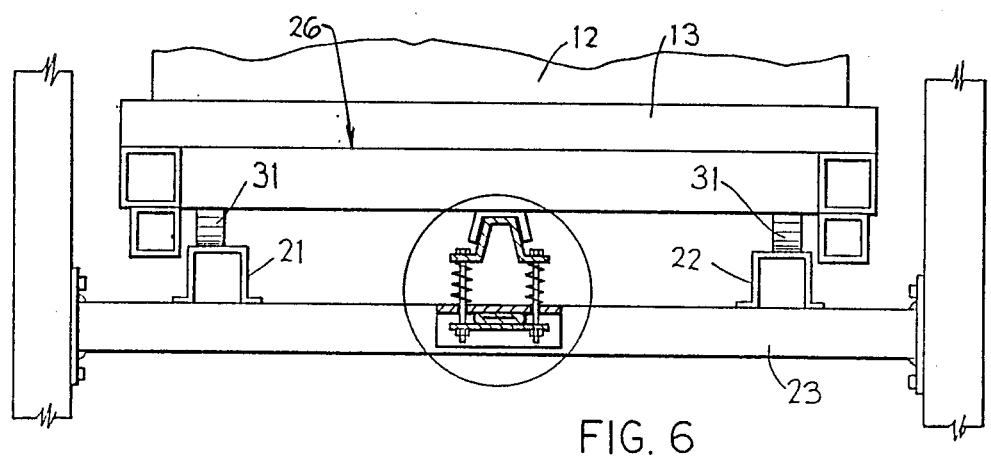
FIG. 6 is a view similar to FIG. 4 but illustrating a variation thereof.
Figure 6A:
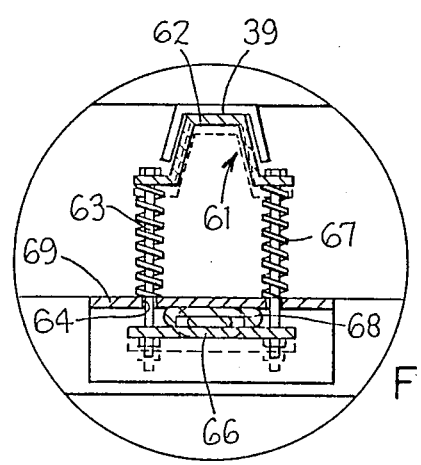
FIG. 6A is an enlargement of the area illustrated in the circled part of FIG. 6.

While FIGS. 3–5 illustrate a preferred embodiment of the invention, nevertheless variations can be made therein, and one such variation is illustrated by FIG. 6. In this case the pallet or buggy 26 is again supported on the support rails 21 and 22, although both support rails 21 and 22 are now fixedly secured to the transverse frame element 23 so as to extend longitudinally along the bay. The cyclic activating system for controlling the pulsating engagement of the brake is now associated directly with the brake, rather than with the support rail.

More specifically, this variation has a channellike brake member 61 having the upper or top wall 62 thereof functioning as a brake element for engagement with the brake pad or element 39 secured to the underside of the buggy. This brake member 61 has, at longitudinally spaced intervals therealong, pairs of support rods 63 secured thereto and extending downwardly through openings 64 formed in a wall 69, the latter being fixedly secured to the transverse frame members 23. The lower ends of these rods 63 are secured by a cross piece 66 spaced downwardly from this top wall 69. Coil springs 67 surround the rod 63 and are confined between the brake member 61 and the top wall 69 so as to continuously urge the brake member 61 upwardly into a position of frictional braking engagement with the brake pad 39. An inflatable elongated hose 66 (comparable to the hose 49 described above) is confined between the plates 66 and 69 and, when inflated, moves the brake member 61 downwardly against the urging of the springs 67 so as to release it from engagment with the brake element 39. This hose 66 is periodically and cyclically inflated and deflated in a regular pattern so as to effect an intermittent and cyclic engagement and disengagement of the brake to create a controlled steplike gravity-urged movement of the buggy downwardly along the support rails 21–22.

With the improved arrangement of this invention, the support rails 21–22 can be provided with a rather minimal pitch, typically two inches to four inches per ten feet of length, and preferably two inches to three inches per ten feet of length. Hence, for a transporter of significant length, such as 100 feet or more, this thus significantly minimizes the vertical drop required to effect efficient gravity-urged movement of the buggies between the input and output ends of the system. This minimization in the vertical drop hence enables a selected number of units to be vertically stacked one above the other in a preselected height, and in fact often permits a preselected height to incorporate one more tier than could normally be provided when utilizing conventional storage rack systems.

While the loads 11 have been described above as comprising articles stacked on a conventional wooden pallet, nevertheless it will be appreciated that the loads could comprise numerous other forms. For example, the loads could comprise articles stacked directly on the buggy, or the buggy itself could comprise a fixture for carrying objects (such as automobile engines), such as for moving such objects along a manufacturing or assembly line.

As to the braking which occurs between the buggy and the rails, it will be appreciated that the brake surfaces could be provided on the sloped or opposed sidewalls if desired. That is, by narrowing the width of the channel member 41, the side legs 42 thereof could be disposed so as to frictionally engage the diverging sidewalls 43 on the brake member so that these surfaces 42–43 would hence automatically frictionally engage and effect braking of the buggy during lowering of the latter.

In addition, the support wheels 31 of the buggy could be provided with lateral flanges, specifically tapered annular flanges, disposed to ride along one side of the support rails 21–22 so as to maintain the buggy on and properly aligned with the rails, in which case the angled sidewalls 42 of the channel 41 could be eliminated if desired. Further, the brake arrangement 36 need not be positioned along the central plane of the transporter, but could be positioned adjacent one end thereof, such as in close proximity to the side of the transporter having the activating means 46 associated therewith.

While the invention has been disclosed for use on and in association with a storage rack system, and while such use of the transporter is highly desirable and is preferred, nevertheless it will be recognized that the transporter of this invention also would be highly desirable for use as a conveyor either by itself or in association with other equipment, such as part of a manufacturing or assembly line for transmitting goods or objects from one work station to another.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a storage rack system having a framework defining a plurality of adjacent columns each defining a plurality of vertically adjacent bays, and a gravity-type transporting apparatus associated with and extending longitudinally along each of said bays for permitting gravity-urged movement of loads from one end of the respective bay to the other end thereof, said transporting apparatus comprising:

a pair of sidewardly spaced and substantially parallel support rails extending longitudinally of said bay, each said support rail defining thereon an upwardly facing and substantially longitudinally uninterrupted support surface extending substantially longitudinally of said bay;

said framework including an elongated stationary mounting rail extending longitudinally thereof in parallel and closely adjacent relationship to one of said support rails, said one support rail being vertically movably supported relative to said mounting rail, said one support rail comprises an elongated channel-like element which opens downwardly and externally telescopes over said mounting rail;

a slave pallet defining a rigid support platform having an upwardly facing upper surface adapted to have a load removably positioned thereon, said slave pallet having a set of at least four support rollers rotatably mounted on said support platform adjacent the corners thereof, said support rollers being disposed in their entirety below said upper surface and in rolling and supporting engagement with said support surfaces;

said slave pallet also having leg means fixedly associated with the underside of said support platform for permitting said pallet to be supported on a supporting surface while maintaining said rollers spaced upwardly out of engagement with said supporting surface, said leg means having lower surface means disposed at an elevation at least slightly below the lowermost elevation of said rollers, said leg means being displaced sidewardly relative to said rollers so as to be free of contact with said rails;

said leg means including sidewardly spaced pairs of front and rear legs fixed to said slave pallet adjacent the corners of the platform, each said leg being positioned directly adjacent an outer side of one of said rollers and projecting longitudinally through an extent greater than the adjacent roller so as to sidewardly protect the roller, each said leg projecting downwardly so as to vertically overlap said support rail at all times when said slave pallet is supported thereon, the front and rear legs adjacent each side of the slave pallet having an open space therebetween along the longitudinal direction for permitting a lifting device to be inserted sidewardly under the support platform;

brake means cooperating with said slave pallet for controlling the gravity-induced movement speed thereof along said support rails, said brake means including a first longitudinally elongated brake member which is positioned under said slave pallet and fixedly mounted with respect to said bay and has a first brake surface which is frictionally engageable with a second brake surface fixedly secured on the underside of said slave pallet; and cyclic activating means for causing intermittent and periodic vertical movement of one said brake surface with respect to the other said brake surface in a cyclic manner between a disengaged position permitting gravity-urged movement of the slave pallet along said support surfaces and an engaged position wherein the slave pallet is stopped by said braking means, said activating means including means for causing cyclic actuation thereof between said engaged and disengaged positions in a periodic and repetitive manner;

said activating means including an elongated flexible conduit inflatable with a pressure fluid and being confined vertically between said mounting rail and said one support rail and extending longitudinally therealong for effecting cyclic vertical displacement of said one support rail, and means for inflating and at least partially deflating said conduit in a cyclic manner for alternately raising and lowering said one support rail to effect cyclic movement of said second brake surface between said disengaged and engaged positions.

2. A system according to claim 1, wherein said slave pallet has a downwardly opening channel-shaped member secured thereto and extending in the longitudinal direction thereof, said channel-shaped member being secured to the underside of said pallet and defining said second brake surface thereon, and said brake member being fixedly secured to said framework and projecting upwardly for engagement with said channel-shaped element when said one support rail is in its lowermost position.

3. A system according to claim 2, wherein said brake member and said channel-shaped member have pairs of side surfaces which diverge as they project downwardly, said brake member being nestingly received within said channel-shaped member, said side surfaces engaging one another during lowering of said one support rail to cause sideward recentering of a misaligned slave pallet.

4. A system according to claim 1, wherein said longitudinally elongated brake member defines thereon an upwardly directed braking surface which defines said first brake surface and which is substantially uninterrupted throughout the longitudinal extent of the respective bay, said brake member extending substantially along the longitudinally extending central vertical plane of the respective bay, and said second brake surface being defined on and facing downwardly from a brake element which is fixedly secured to the underside of said slave pallet, said second brake surface including multiple braking surface areas which are associated with the underside of said slave pallet and are disposed substantially along the longitudinally-extending center line thereof.

5. A system according to claim 4, wherein the brake member and brake element comprise vertically interfitting channel-like elements which effectively nest one within the other to restrict sideward displacement of the slave pallet relative to the support rails.

6. A system according to claim 1, wherein said leg means includes a pair of sidewardly-spaced center legs disposed adjacent the opposite side edges of the support platform and projecting downwardly therefrom, said center legs being longitudinally disposed between and spaced longitudinally from the front and rear legs associated with a respective side of the slave pallet.

* * * * *